United States Patent [19]

Lucas

[11] Patent Number: 5,314,964
[45] Date of Patent: May 24, 1994

[54] LOW TEMPERATURE PROCESS FOR THE PREPARATION OF ISOPROPENYL-ALPHA, ALPHA-DIMETHYLBENZYL ISOCYANATE—GRAFTED LATEXES

[75] Inventor: Howard R. Lucas, Danbury, Conn.

[73] Assignee: Cytec Technology Corp., Wilmington, Del.

[21] Appl. No.: 609,496

[22] Filed: Nov. 2, 1990

[51] Int. Cl.$^5$ .................. C08F 265/00; C08F 267/00
[52] U.S. Cl. ........................ 525/293; 525/69; 525/77; 525/173; 525/278; 524/458; 524/507; 526/223; 526/310
[58] Field of Search ............... 524/458, 507; 525/293, 525/278, 69, 77; 526/223, 310, 173; 528/50, 69, 75

[56] References Cited

U.S. PATENT DOCUMENTS

| | | | |
|---|---|---|---|
| 4,579,911 | 4/1986 | D'Sidocky | 525/223 |
| 4,694,057 | 9/1987 | Smith et al. | 526/223 |
| 4,766,185 | 8/1988 | Ryntz | 525/479 |
| 4,839,230 | 6/1989 | Cook | 428/423.1 |
| 5,164,453 | 11/1992 | Fisher et al. | 525/293 |

FOREIGN PATENT DOCUMENTS 185606  6/1986  European Pat. Off. .
194222  9/1986  European Pat. Off. .

OTHER PUBLICATIONS

"Redox Initiation", Principles of Polymerization, George Odian, 2nd Ed., pp. 201 and 682, John Wiley & Sons, 1981.
"Plastics Technology", Nov. 1989, p. #13.
"Modern Plastics", Dec. 1989, p. 16.

Primary Examiner—Paul R. Michl
Assistant Examiner—Tae H. Yoon
Attorney, Agent, or Firm—Bart E. Lerman; Michael J. Kelly; Claire M. Schultz

[57] ABSTRACT

A process for the preparation of novel grafted latexes having backbones formed from unsaturated monomers and having pendent isocyanate containing sidechains derived from isopropenyl-alpha, alpha- dimethylbenzyl isocyanate or copolymers thereof is described.

Grafting latexes is carried out using a free radical redox initiator system in an aqueous medium. Latexes such as polybutadiene, polyvinyl chloride, and polyvinyl chloride-acrylic copolymers are converted to the corresponding isocyanate-functional latexes by the process of the invention. The isocyanate-functional grafted and cografted latexes described are useful in curable compositions.

35 Claims, 3 Drawing Sheets 200 nm

LOW TEMPERATURE PROCESS FOR THE PREPARATION OF ISOPROPENYL-ALPHA, ALPHA-DIMETHYLBENZYL ISOCYANATE—GRAFTED LATEXES

FIELD OF THE INVENTION

This invention relates to the preparation of isocyanate-functional latexes which are prepared by grafting a graftable latex with isopropenyl-alpha, alpha-dimethylbenzyl isocyanate or cografting said latexes with isopropenyl-alpha, alpha-dimethylbenzyl isocyanate in combination with a cografting comonomer at low temperatures.

BACKGROUND OF THE INVENTION

Isopropenyl-alpha,alpha-dimethylbenzyl isocyanate or TMI ® Unsaturated Isocyanate, a product of American Cyanamid Company under the trade name TMI ® (meta) Unsaturated Aliphatic Isocyanate, is a monomer which has two distinct reactive groups, a vinylic group and an isocyanate group. TMI ® Unsaturated Isocyanate occurs as the meta isomer, para isomer or mixtures of meta and para isomers. The meta isomer of TMI ® isocyanate is represented by the formula:

TMI ® Unsaturated Isocyanate (meta)

Grafting is an art recognized process in which a reactive material, usually a monomer or an oligomer, is attached onto a graftable material, usually a polymer having a reactive site or a functional group capable of reacting with the reactive material to be grafted. The reaction by which grafting takes place can be, without limitation, any reaction which allows two materials to combine. Most frequently, however, it is a free radical reaction.

Homografting is defined herein as a grafting process in which only a monomer of one type (viz. TMI ® Unsaturated Isocyanate) is used as the reactive material, resulting in a homografted polymer having one or more groups pendently attached to the graftable polymer.

Cografting is defined herein as a grafting process in which more than one monomer is used as the reactive material resulting in a cografted polymer having groups derived from monomers as well as one or more comonomers, such as copolymeric groups pendantly attached to a graftable polymer.

Grafting of isopropenyl-alpha, alpha-dimethylbenzyl isocyanate onto isocyanate-reactive polymers via the isocyanate functionality has been mentioned in U.S. Pat. Nos. 4,766,185, 4,839,230, and 4,579,911 producing polymers having pendant isopreny; groups. The cited patents however do not mention free radical homografting or cografting to produce polymers with pendant NCO groups.

The possibility of extrusion grafting of polyolefins with meta-isopropenyl alpha,alpha-dimethylbenzyl isocyanate via the isopropenyl group is disclosed in "Plastics Technology", November 1989, p. 13. Free radical grafting of meta-isopropenyl-alpha, alpha-dimethylbenzyl isocyanate onto polyolefins, polystyrene, acrylics, and polyesters has also been disclosed in "Modern Plastics", December 1989, page 16 with no mention of cografting.

Grafting saturated and unsaturated polymers with isopropenyl-alpha, alpha-dimethylbenzyl isocyanate or with isopropenyl-alpha, alpha-dimethylbenzyl isocyanate in combination with a cografting comonomer is disclosed in a copending application entitled "Isopropenyl-alpha, alpha-dimethylbenzyl Isocyanate-Grafted Polymers."

European Patent Application No. 185,606, published on Jun. 25, 1986, discloses a free-radical initiated grafting of a thioester synergist adduct of meta-isopropenyl-alpha, alpha-dimethylbenzyl isocyanate onto a styrene-butadiene rubber via the isopropenyl group. The grafted polymer product of the disclosure, however, is not isocyanate-functional. Furthermore, the grafting process is of low efficiency due to the poor reactivity of the isopropenyl group. Finally, the disclosure makes no reference to cografting with meta-isopropenyl-alpha,alpha-dimethylbenzyl isocyanate or adducts in combination with a cografting comonomer. Emulsion polymerization of meta-isopropenyl-alpha, alpha-dimethylbenzyl isocyanate is also disclosed in Eur. Pat. No. 194,222.

Copending United States Patent application No. 07/571,801 filed Aug. 23, 1990 describes the preparation of graft copolymers containing TMI ® Unsaturated Isocyanate.

It is the object of this invention to provide a process for the preparation of isocyanate-functional latexes by homografting a graftable latex with isopropenyl-alpha, alpha- dimethylbenzyl isocyanate, or cografting in combination with a cografting comonomer at low temperatures.

SUMMARY OF THE INVENTION

Isocyanate-functional latexes are prepared by a novel low temperatures grafting process comprising homografting isopropenyl-alpha,alpha-dimethylbenzyl isocyanate, or cografting with isopropenyl-alpha,alpha-dimethylbenzyl isocyanate in combination with a cografting comonomer onto a graftable latex such as polybutadiene with the aid of a free radical redox initiator system in a liquid medium.

DETAILED DESCRIPTION

The grafting process of the invention comprises a process for preparing homografted latexes and a process for preparing cografting latexes.

"Low temperature process" is defined herein as a process which is carried out at temperatures ranging from about 0° C. to about 40° C.

The term "latex" as defined herein refers to the naturally occurring polymers, obtained as viscid, milky secretions of the laticiferous vessels of certain seed- bearing plants such as Castilla Elastica or Hevea Brasilienis, existing typically as a colloidal suspension of rubber particles stabilized by protein. The term "latex" also refers to colloidal suspensions of synthetic polymers and rubbers, as prepared by emulsion or suspension polymerization of unsaturated monomers. The methods of preparation of synthetic latexes are described in great detail by H. Mark, S. C. Marvel, H. W. Melville, and G. S. Whitby in the "Emulsion Polymerization" Section of "High Polymers", Vol. 9, F. A. Bovey, I. M. Kolthoff, A. I. Medalia, and E. J. Meehan, Editors, Interscience Publishers, Inc., 1955, pages 1 to 93, the contents of which are incorporated herein by reference.

PROCESS FOR PREPARING HOMOGRAFTED POLYMERS

The low temperature process for preparing an isocyanate- functional homografted latex comprises the steps of:

(A) introducing into the reaction zone containing a liquid medium and a graftable latex, a homografting charge comprising:

(i) meta- or para-isopropenyl-alpha, alpha-dimethylbenzyl isocyanate represented by the formulae:

or a mixture thereof;

(ii) a hydroperoxide, and (iii) a free radical redox initiator solution sufficient to decompose the hydroperoxide; and

(B) maintaining the reaction zone at a temperature and for a time sufficient to graft the isopropenyl-alpha, alpha-dimethylbenzyl isocyanate.

PROCESS FOR PREPARING COGRAFTED LATEXES

The low temperature process for preparing an isocyanate-functional cografted latex comprises the steps of:

(A) introducing into a reaction zone containing a liquid medium and a graftable latex, a cografting charge comprising:

(i) meta- or para-isopropenyl- alpha, alpha-dimethylbenzyl isocyanate represented by the formulae:

or a mixture thereof;

(ii) an unsaturated comonomer represented by the formula:

wherein $R^1$ is hydrogen or alkyl; and $R^2$ is a methoxycarbonyl, ethoxy- carbonyl, propoxycarbonyl, butoxycarbonyl, hexoxycarbonyl, 2-ethylbexoxycarbonyl, lauroxycarbonyl, alkyl of 1 to 20 carbon atoms, aryl, aminocarbonyl, acetoxy, and cyano groups;

(iii) a hydroperoxide, and (iv) a free radical redox initiator solution in an amount sufficient to decompose the hydroperoxide; and (B) maintaining the reaction zone at a temperature and for a time sufficient to cograft the monomers.

GRAFTABLE LATEXES USED IN THE METHOD OF THE INVENTION

The graftable latexes usuable in the invention are free radically graftable latexes having saturated or unsaturated backbones such as polyvinyl chloride or polybutadiene latexes. They can be polyolefins such as polypropylene, polyethylene, styrenics such as polystyrene, acrylics such as polymethyl methacrylate, polybutadiene, polyester, polyvinyl chloride, and polyvinyl acetate latexes and the like. The graftable latexes usable in the invention can be blends of saturated or unsaturated latexes including saturated and unsaturated elastomers. They can also be latexes obtained by polymerizing a plurality of monomers. Examples of copolymeric graftable or cograftable latexes are those arising from the copolymerization of ethylene and propylene mixtures to produce ethylene-propylene copolymer latexes, ethylene and vinyl acetate mixtures to produce ethylene-vinyl acetate copolymers latexes, and other similar systems. They may contain only water or they may contain water and one or more organic solvents.

Particularly useful are members of the polybutadiene, polyvinyl chloride, and polyvinyl chloride-acrylic copolymers and similar classes of latexes which can be produced according to well known and widely practiced methods, such as by emulsion polymerization of the corresponding monomers or monomer mixtures.

An example of an saturated polyvinyl chloride latex polymer is GEON®351 Latex, a product of B. F. Goodrich Company, Cleveland, Ohio, having the following properties:

| | |
|---|---|
| Total Solids (%) | 57.5 |
| Brookfield Viscosity at 25° C. (centipoise) | 20 |
| Surface Tension (Dynes/cm) | 37.5 |
| Specific Gravity (Latex) | 1.18 |
| Specific Gravity (Solids) | 1.35 |
| Glass Transition Temperature (°C.) | +62 |
| Emulsifier (Synthetic) | Anionic |
| pH | 9.5-11.0 |

Another example of a saturated vinyl chloride-based latex is GEON®460X46 vinyl chloride - acrylic copolymer latex, a product of B. F. Goodrich Company, Cleveland, Ohio, having the following properties:

| | |
|---|---|
| Total Solids (%) | 49.0 |
| Brookfield Viscosity at 25° C. (centipoise) | 20 |

| | |
|---|---|
| Surface Tension (Dynes/cm) | 36 |
| Specific Gravity (Latex) | 1.113 |
| Specific Gravity (Solids) | 1.272 |
| Glass Transition Temperature (°C.) | +7 |
| Emulsifier (Synthetic) | Anionic |
| pH | 4.5–7.0 |

An example of an unsaturated latex is polybutadine latex T-291, an experimental product of Reichhold Chemical, Inc., Emulsion Polymer Division, Dover, Dela., having the following properties:

| | |
|---|---|
| Total Solids (%) | 45.3 |
| Surface Tension (Dyne/cm) | 65–75 |
| Coagulum Content (% on 100 mesh screen) | less than 0.05 |
| pH | 8.8–9.2 |
| Particle Size (A) | 950–1150 |
| Mooney Viscosity (ML/4 at 100° C.) | 31–43 |

ISOPROPENYL-alpha, alpha-DIMETHYLBENZYL ISOCYANATE USEFUL IN THE METHOD OF THE INVENTION

The isocyanate-functional monomers used in the invention are meta- and para-isopropenyl-alpha, alpha-dimethylbenzyl isocyanates or mixtures thereof. meta-Isopropenyl-alpha,alpha-dimethylbenzyl isocyanate, commercially available under the trade name TMI ® (Meta) Unsaturated Aliphatic Isocyanate (American Cyanamid Company, Wayne, N. J. ), is the preferred isocyanate-functional monomer usable as the homografting monomer when used alone, or as the cografting monomer component when used in combination with a cografting comonomer. It is represented by the formula:

having the following properties:

| | |
|---|---|
| CAS Registry Number: | 2094-99-7 |
| Appearance: | Colorless Liquid |
| NCO Content (%, Theoretical): | 20.9 |
| Boiling Point (°C., 1 Atmosphere): | 270 |
| Vapor Pressure (mm Hg, 100° C.): | 2 |
| Viscosity (27° C., cp): | 3 |
| Density (g/ml): | 1.01 |

In addition to the meta- isomer above, the para-isomer of TMI, TMI ® (Para) Unsaturated Aliphatic Isocyanate, is also usable as the grafting monomer in the practice of the invention, and is represented by the formula:

having the following properties:

| | |
|---|---|
| CAS Registry Number: | 2889-58-9 |
| Appearance: | Colorless liquid |
| Melting Point (°C.): | 0 |
| Vapour Pressure (25° C., mm Hg): | 0.0046 |
| Vapor Density (Air = 1): | 100.5 |

Upon grafting TMI ® Unsaturated Aliphatic Isocyanate alone or with cografting comonomer such as methyl methacrylate onto a graftable latex such as polybutadiene, an isocyanate-functional grafted latex is produced having pendantly attached isocyanate groups which are capable of further reactions. A typical such reaction is crosslinking with isocyanate-reactive polyfunctional materials, particularly with moisture, amines, mercaptans and alcohols to produce polyurea and polyurethane linkages.

COGRAFTING COMONOMER USEFUL IN THE PROCESS OF THE INVENTION

Suitable cografting comonomers are those which can copolymerize with the vinyl group of isopropenyl-alpha, alpha-dimethylbenzyl isocyanate to give copolymers which can then graft to the interior or the exterior of the latex. The comonomers are selected, without limitation, from the classes of mono-substituted and geminally disubstituted unsaturated compounds and include: alpha-olefins, vinyl carboxylates, vinyl ethers, alpha, beta-unsaturated aldehydes and ketones, styrenes, alpha-methylstyrenes, acrylic and methacrylic esters, acrylic and methacrylic amides, and acrylic and methacrylic nitriles.

The cografting comonomers usable in the invention are unsaturated comonomers represented by the formula:

wherein $R^1$ is hydrogen or an alkyl group such as methyl, and $R^2$ is a polymerizably activating group such as metboxycarbonyl, ethoxycarbonyl, propoxycarbonyl, butoxycarbonyl, hexoxycarbonyl, 2-ethylhexoxycarbonyl, lauroxycarbonyl, alkyl of 1 to 20 carbon atoms, aryl, aminocarbonyl, alkoxy, acyloxy, cyano, and the like.

Examples of suitable cografting comonomers include the following monomers: vinyl acetate, methylene valerolactone, hexyl vinyl ether, methyl vinyl ketone, acrolein, styrene, alpha-methyl styrene, para-methyl styrene, acrylamide, methacrylamide, N,N-dimethylacrylamide, acrylonitrile, metbacrylonitrile, methyl acrylate, methyl methacrylate, ethyl acrylate, ethyl methacrylate, propyl acrylate, propyl methacrylate, butyl acrylate, butyl methacrylate, hexyl acrylate, hexyl methacrylate, ethylhexyl acrylate, ethylhexyl methacrylate, lauryl acrylate, lauryl methacrylate, and the like.

The preferred class of cografting comonomers are the acrylate and methacrylate esters represented by the formula:

$$CH_2=\overset{R^4}{\underset{|}{C}}-COOR^5$$

wherein $R^4$ is hydrogen or methyl and $R^5$ is an alkyl group of 1 to 20 carbon atoms, an aryl group, or an aralkyl group.

The most preferred acrylates and methacrylates are methyl methacrylate, ethyl, methacrylate, butyl acrylate, butyl methacrylate, hexyl acrylate, hexyl methacrylate, ethylhexyl acrylate, and ethylhexyl methacrylate.

FREE RADICAL INITIATORS USEFUL IN THE PROCESS OF THE INVENTION

The grafting initiators are the redox systems which are capable of generating free radicals when appropriate proportions of a "hydroperoxide component" oxidizing agent and a "free radical redox initiator solution component" reducing agent come into contact. Together they form the "free radical redox initiator systems" used in the invention.

The free radical redox systems usable in the process of the invention are redox initiator systems well known in the art. The most widely used combinations consist of:

(1) a hydroperoxide component, and
(2) a redox initiator solution component comprising sodium formaldehyde sulfonate, ferric chloride, deionized water, or other solvents.

The combination of the hydroperoxide, sodium formaldehyde sulfonate, and ferric chloride typically in an aqueous medium is known to generate free radicals in a redox reaction.

In the process of the invention, homografting or related cografting reactions are initiated by combining the hydroperoxide and the redox initiator solution components at low temperatures (0° to 40° C).

The preferred hydroperoxide is tertiary butyl hydroperoxide, although other lower alkyl hydroperoxides, acyl peroxides, peroxycarboxylic acids, peroxysulfonic acids, and hydrogen peroxide are also usable.

Variations of the redox initiators described above are also usable in the process of the invention. These are described in great detail by H. Mark, S. C. Marvel, W. H. Melville, and G. S. Whitby in "Emulsion Polymerization" Section of "High Polymers", Vol. 9, F. A. Bovey, I. M. Kolthoff, A. I. Medalia, and E. J. Meehan, Editiors, Interscience Publishers, Inc., 1955, pages 71 to 93, the contents of which are incorporated herein by reference. Additional examples of redox systems are described in the article, "Initiators, at pages 357 to 365, Volume 13, 3'd edition (1981) of the Kirk-Othmer Encyclopedia of Chemical Technology, published by John Wiley sons, New York (ISBN 0-471-02066-4).

Specific examples of redox systems usable in the process of the invention are described in greater detail below.

The free radical initiators usable in grafting are redox systems in which an oxidizing and a reducing agent, each thermally stable by itself, react to form free radicals at low temperatures. This is in contrast to the conventional free radical initiators which, to be effective, must either be unstable at room temperature, or else be heated to elevated temperatures. The redox systems used in the process of the invention are effective at low temperatures.

The reducing agent in the redox initiator solution is preferably in approximately stoichiometric proportion to the hydroperoxide oxidizing agent components to generate free radicals effectively.

The following redox systems are particularly useful in the process of the invention.

1. Hydrogen Peroxide/Ferrous Redox System $$H_2O_2 + Fe^{++} \longrightarrow HO^{\cdot} + OH^- + Fe^{+++}$$

2. Persulfate/Ferrous Redox System $$S_2O_8^{--} + Fe^{++} \longrightarrow SO_4^{\cdot-} + SO_4^{--} + Fe^{+++}$$

3. Cumene Hydroperoxide/Ferrous Redox System $$C_6H_5C(CH_3)_2OOH + Fe^{++} \longrightarrow$$

$$C_6H_5C(CH_3)_2O^{\cdot} + Fe^{+++} + OH^-$$

The metal reducing agent such as iron may be present in a complex or chelated form. Examples of chelating groups are polyamines such as diethylenetriamine, ethylenediaminetetraacetic acid, and the like.

Oxidizing agents other than hydroperoxides are also usable, provided that the systems containing them are capable of generating free radicals at low temperatures. Examples of these include ceric sulfate, permanganate, chlorite, and hypochlorite.

Other usable systems include hexacyanoferrate (III)/mercaptan, pentacyanonitritoferrate (III)/mercaptan, chromate/arsenic trioxide, chromate/arsenite, and nitroprusside/hydroperoxide couples.

In the preferred practice of the invention, the free radical redox initiator solution component is slowly added to the reaction zone containing:

(1) the monomer or monomers to be grafted,
(2) the hydroperoxide component, and
(3) the graftable latex, said redox solution being in quantities sufficient to decompose most of the hydroperoxide.

It is also possible to premix the grafting monomers with the hydropoxide prior to addition to the reaction zone after which addition, the free radical redox initiator solution is introduced gradually, over a period of time, preferably in less than 5 minutes.

It should be noted that if ingredients of the grafting charge are mixed away from or in the absence of the graftable latex, non-grafting reactions may be initiated by the redox initiator system. If the components of the grafting charge are premixed prior to addition to the reaction zone containing the latex, initiation by the hydroperoxide/redox solution system will cause polymerization or copolymerization of the monomers and lead to inefficient grafting of the latex.

The free radical initiators can be used in combination with a chain transfer agent such as a mercaptan to limit the grafting sites and the length of the grafted side chains. Generally, however, they are not used.

RATIO AND PROPORTION OF INGREDIENTS USED IN THE HOMOGRAFTING METHOD OF THE INVENTION

The meta- or para- isopropenyl- alpha, alpha-dimethylbenzyl isocyanate concentration in the homografting charge is from about 40 weight percent to about 99.99 weight percent.

The hydroperoxide concentration is from 5 to 0.01 weight percent.

The free radical redox initiator solution concentration in the homografting charge is from about 60 weight percent to about 0.01 weight percent.

The ratio of the meta- or para-isopropenyl -alpha, alpha-dimethylbenzyl isocyanate to the hydroperoxide is from about 9:1 to about 9,999:1, and its ratio to the free radical initiator redox solution is from about 1:1 to about 9,999:1.

The ratio of the graftable polymer to the homografting charge is in the range of from about 100:1 to about 1:1, with 10:1 to 2:1 range being particularly preferred.

RATIO AND PROPORTION OF INGREDIENTS USED IN THE COGRAFTING METHOD OF THE INVENTION

The meta- or para-isopropenyl-alpha, alpha-dimethylbenzyl isocyanate concentration in the cografting charge is from about 1 weight percent to about 99 weight percent, with 20 weight percent to 40 weight precent range being particularly preferred.

The unsaturated comonomer concentration in the cografting charge is from about 99 weight percent to about 1 weight percent, with 80 weight percent to 60 weight percent range being particularly preferred.

The weight percent of the hydroperoxide in the congrafting charge is from about 0.01 weight percent to about 5 weight percent.

The weight percent of the free radical redox initiator solution in the cografting charge is from about 0.01 weight percent to about 60 weight percent, with 0.2 weight percent to 0.6 weight percent range being particularly preferred.

The ratio of the meta- or para-isoprop-enylalpha, alpha-dimethylbenzyl isocyanate to the unsaturated comonomer is from about 99:1 to about 1:99, and more preferably from 1:1 to 10:1.

The ratio of the total mononomers (viz. metaor para-isoprenyl-alpha, alpha-dimethylbenzyl isocyanate and the unsaturated comonomer) to the free radical redox initiator solution is from about 1:1 to about 9,900:1, and the ratio of the monomers to the hydroperoxide is from about 0.2:1 to about 9900:1.

The ratio of the graftable polymer to cografting charge is in the range of from about 100:1 to about 1:1, with 10:1 to 2:1 range being particularly preferred.

REACTION CONDITIONS FOR HOMOGRAFTING OR COGRAFTING USED IN THE METHOD OF THE INVENTION

The reaction zone in the process of the invention is a reactor suitable for the purpose of carrying out either batch or continuous reactions. The addition of the ingredients can be premixed or sequential. In the premixed mode, all the ingredients of the grafting charge are combined prior to addition to the reaction zone and are added without delay preferably within less than 5 minutes. It is preferred however that the process is carried out without premixing.

In the sequential mode, the ingredients of the grafting charge, with the exception of the redox initiator solution, are added in any combination or order to the reaction zone, and the redox initiator solution is thereafter added.

It is possible to carry out the sequential mode with the hydroperoxide added last instead of the redox initiator solution, however, when this mode is used, mixing and reaction rates become more difficult to control. Preferably, when the addition of the ingredients is sequential, the free radical redox initiator solution is added last, without being premixed with the other ingredients, so as not to initiate free radical polymerization of the monomers or decomposition of the hydroperoxide without grafting.

In both homografting an cografting processes, the temperature of the reaction zone in the process of the invention is maintained within the range of from about 0° C. to about 40° C., with 32° C. to 36° C. range being preferred.

The introduction time of the homografting or cografting charge in the process of the invention is in the range of about 5 seconds to about 5 hours, with 1 to 3 hour range being particularly preferred.

The homografting or cografting times after the addition of the homografting or cografting charge is in the range of about 5 minutes to about 5 hours, with 1 to 3 hours range being particularly preferred, so that preferably at least 10 weight percent of the monomers in the homografting or cografting charge are allowed to react.

After homografting or cografting, the unreacted monomers can be separated from the homografted or cografted polymers by extraction with a monomer dissolving solvent or by vacuum distillation. Usually, however, the reaction is allowed to go to completion so that a separation is not required.

EXAMPLE 1

A solution of methyl methacrylate (79.3 g, 0.79 mole), meta-isopropyenyl-alpha, alpha-dimethylbenzyl isocyanate (8.8 g. 0.044 mole), and tert-butyl hydroperoxide (0.20 g, 0.0022 mole) was added to a stirred suspension of T-291 Polybutadiene Latex, an experimental product of Reichhold Chemicals (579.5 g of latex having 45.3% solids in water) and deionized water (76.8 g) at room temperature. After 1 hour of stirring at room temperature, a redox initiator solution (5 ml) comprising sodium formaldehyde sulfonate (0.383 g), ferric chloride (0.09 g), and deionized water (4.6 g) was added. After 6 minutes an exothermic reaction was observed which raised the temperature of the mixture to 33.5° C. within two hours. After an additional 24 hours at room temperature without stirring, a cografted polybutadiene latex was obtained having the following characteristics:

(1) The product contained no free meta-isopropenyl-alpha, alpha-dimethylbenzyl isocyanate, as determined by gas chromatography).

(2) The product contained methyl methacrylate at a level corresponding to 4% of the original methyl methacrylate charge, as determined by gas chromatography.

Example 1 illustrates the preparation of cografted polybutadiene latex by the process of the invention.

EXAMPLE 2

The procedure of Example 1 was followed with the exception that 35.2 gram of meta-isopropenyl-alpha, alpha-dimethylbenzyl isocyanate and 50.9 grams of methyl methacrylate were used. At the end of the reaction, 1.7% of the original meta-isopropenyl-alpha, alpha-dimethylbenzyl isocyanate and 1.6% of the methyl methacrylate were unreacted as determined by gas chromatography.

Example 2 illustrates the preparation of a cografted latex by the process of the invention at a higher meta-isopropenyl-alpha, alpha-dimethylbenzyl isocyanate level than Example 1.

EXAMPLE 3

The procedure of Example 1 was followed with the exception that the methyl methacrylate was replaced with vinyl acetate. The resulting product had unreacted meta-isopropenyl-alpha, alpha-dimethylbenzyl isocyanate at a level corresponding to 2.5% of the original charge. It also contained unreacted vinyl acetate at a level corresponding to 8.7% of the original charge.

Example 3 illustrates the preparation of a cografted latex with vinyl acetate, a different cografting comonomer than methyl methacrylate, by the process of the invention.

EXAMPLE 4

The grafted latexes of Example 1, Example 2, and Example 3 were drawn down to produce coatings A, B, and C, respectively, coating D from ungrafted polybutadiene latex was also included as a control. The procedure is described in greater detail below:

The grafted latex products were drawn down on glass plates using an 0.2 Mm (8 mil) Bird bar. The coatings were then air dried at 25° C. for 2 days to allow moisture cure. After removing the coatings from the glass surface, they were cut into 2.5×2.5 mm squares and the square coatings were allowed to stand in hexane for 24 hours and the percent swelling of each coating was calculated by comparison of the areas of the corresponding unswollen grafted latex. The results are summarized in Table 1.

It is concluded from the results in Table 1 that air dried films obtained from the grafted polybutadiene latexes prepared by the process of the invention substantially retain their integrity, particularly at high M-TMI ® isocyanate loadings. This is in contrast to the rapid and complete disintegration of the starting material latex derived film, coating D compared to the only modest swelling of the cografted latex films.

TABLE 1

| SWELLING$^a$ OF COGRAFTED POLYBUTADIENE LATEXES | |
|---|---|
| Coating | Swelling (%) |
| A (Example 1)$^{(b)}$ | 42.5 |
| B (Example 2)$^{(b)}$ | 22.5 |
| C (Example 3)$^{(b)}$ | 60.0 |
| D (T-291 Latex)$^{(c)}$ | Disintegrated |

$^{(a)}$In hexane, 24 hours at room temperature.
$^{(b)}$Cografted butadiene latex of the Example.
$^{(c)}$Ungrafted butadiene latex T-291.

EXAMPLE 5

The procedure of Example 1 was followed with the exception that no methyl methacrylate was added. The resulting product had unreacted meta-isopropenyl-alpha, alpha-dimethylbenzyl isocyanate corresponding to 17% of the original amount charged.

This Example illustrates that homografting meta-isopropenyl-alpha, alpha, dimethylbenzyl isocyanate is a somewhat less efficient process than cografting meta-isopropenyl-alpha, alpha-dimethylbenzyl isocyanate in combination with a cografting comonomer.

EXAMPLE 6

Figure 1:
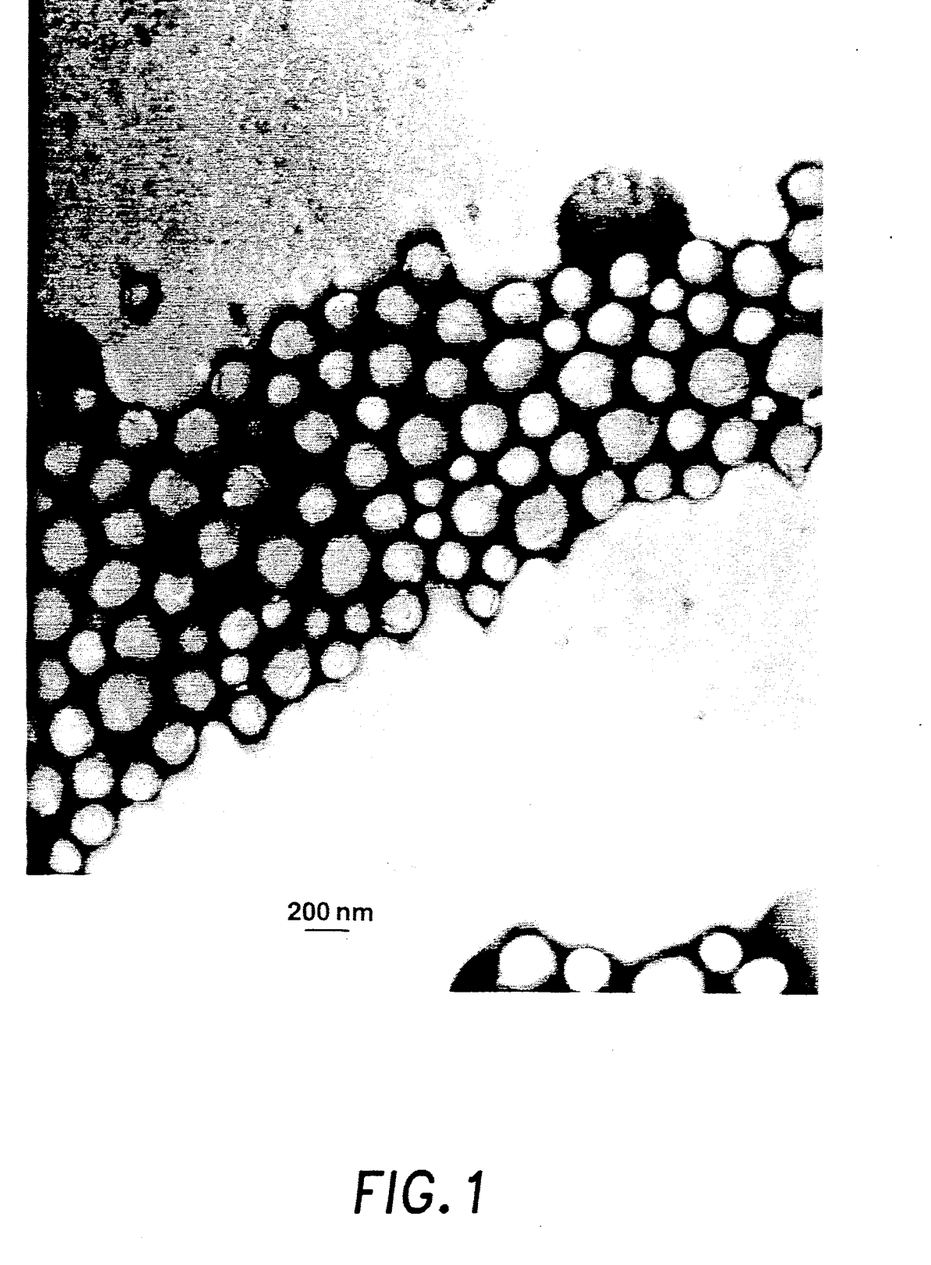
FIG. 1 is a photomicrograph of an ungrafted polyvinylchloride latex.
Figure 2:
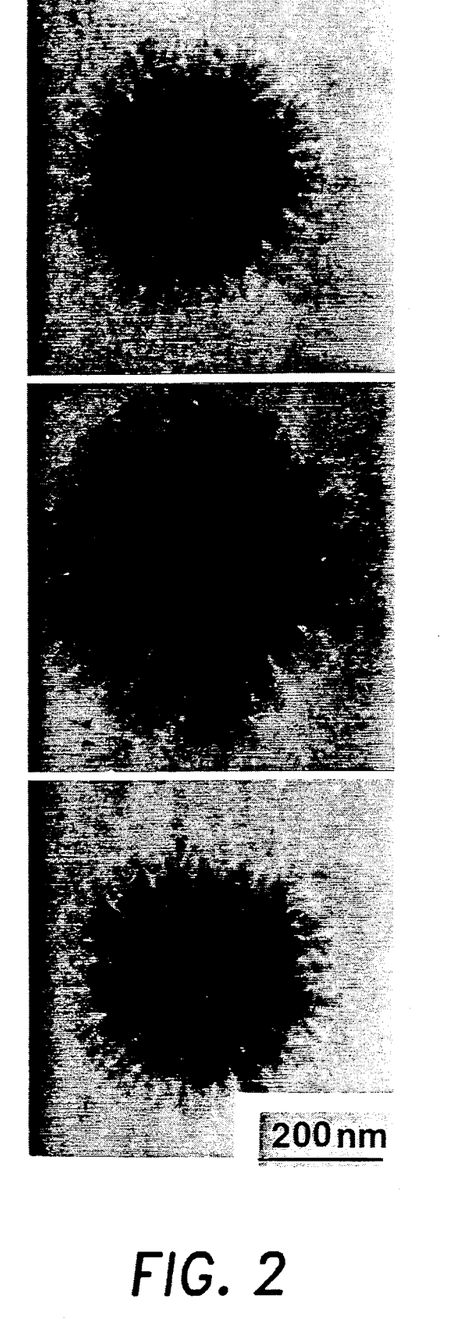
FIG. 2 is a photomicrograph of TMI ® cografted on the surface of the polyvinylchloride latex particles.

A solution of methyl methacrylate (59.5 g, 0.595 mole) and tert-butyl hydroperoxide (0.4 g, 0.0044 mole) was added to a stirred suspension of GEON ®351 Polyvinyl Chloride Latex, a product of B. F. Goodrich Company (590 g latex having 57.6% solids in water) and deionized water (90.0 g) at room temperature. After further stirring (5 minutes), meta-isopropenyl-alpha, alpha-dimethylbenzyl isocyanate (25.5 g, 0.127 mole) was added. After stirring the mixture for an additional 50 minutes, a redox initiator solution (10.6 ml) prepared as described in Example 1 was added. The peak temperature after 1 hour was 36° C. After an additional hour of stirring, the stirring was stopped and the reaction mixture was allowed to stand at room temperature overnight. The product thus obtained was a polyvinylchloride latex grafted with a copolymer formed from substantially all of the TMI ® unsaturated isocyanate and the methyl methacrylate monomers. The product contained as unreacted monomers meta-isopropenyl-alpha, alpha-dimethylbenzyl isocyanate corresponding to 0.2% of the original amount charged, and also contained methyl methacrylate corresponding to 0.5% of the original amount ungrafted charged. FIG. 1 is a stained electron beam photomicrograph of the ungrafted polyvinyl chloride latex used in this Example. FIG. 2 is a stained electron beam photomicrograph of individual grafted latex particles prepared by this Example. FIG. 2 shows that grafting took place on the exterior of the polyvinyl chloride latex particles.

This Example illustrates cografting of a polyvinyl chloride latex by the process of the invention.

EXAMPLE 7

Figure 3:
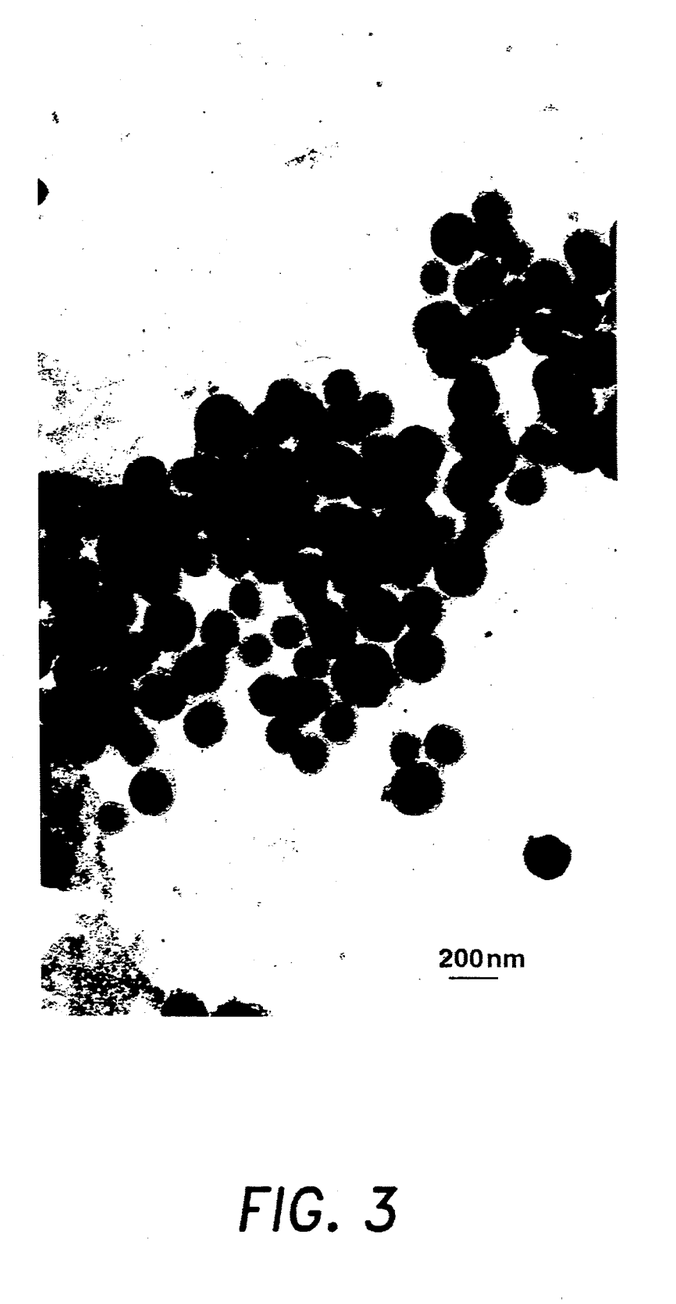
FIG. 3 is a photomicrograph of a TMI ® cografted polyvinylchloride latex where grafting has penetrated into the latex.

The procedure of Example 6 was followed with the exception that chloroform (34.5 gram) was added with the water to swell the polyvinyl chloride latex, and then stirred for 15 minutes prior to the addition of the monomers. The product thus obtained was a polyvinylchloride latex grafted with a copolymer formed from substantially all of the TMI ® unsaturated isocyanate and the methyl methacrylate monomers. The product contained as unreacted monomers meta-isopropenyl-alpha, alpha-dimethylbenzyl isocyanate corresponding to 0.5% of the original amount charged, and also contained methyl methacrylate corresponding to 1.5% of the original amount charged. FIG. 3 is a stained electron beam photomicrograph of grafted latex particles prepared by this Example. Comparison of stained electron beam photographs of the ungrafted (FIG. 1) and the grafted (FIG. 3) particles indicated grafting to have penetrated into the polyvinyl chloride latex particles.

EXAMPLE 8

The procedure of Example 6 was followed using the following:

(1) GEON ® 460X46 Polyvinyl Chloride-Acrylic Latex, a product of B. P. Goodrich Company (541.3 gram)
(2) Deionized Water (115.0 gram)
(3) Methyl Methylcrylate (50.9 gram)
(4) Meta-Isopropenyl-alpha, alpha-dimethylbenzyl Isocyanate (35.2 gram)
(5) tert-Butyl Hydroperoxide (0.20 gram)
(6) Redox Initiator Solution of Example 1 (5.3 ml)

The product thus obtained contained meta-isopropenyl-alpha, alpha-dimethylbenzyl isocyanate corresponding to 1.2% of the original amount charged, and also methyl methacrylate corresponding to 0.8% of the original amount charged.

A coating was prepared from this material and tested as described in Example 4. After 24 hours in hexane, the coating showed no swelling whatsoever indicating the presence of sufficient crosslinking in the coating to retain its integrity in the swelling experiment.

EXAMPLE 9

The procedure of Example 1 was followed with the following:

| Methyl methacrylate | 61.7 g |
|---|---|
| meth-isopropenyl-alpha,alpha-dimethyl benzyl isocyanate | 26.4 g |
| tert-butyl hydroperoxide | 0.2 g |
| T-291 polybutadiene latex (44.2% solids) | 593.9 g |
| deionized water | 54.2 g |
| redox initiator solution | 5.3 g |

The peak temperature was 28° C. After the reaction was completed, the reaction product was titrated with butylamine. Titration showed that about 84.5% of the amount of NCO charged was still present in the product at the end of the reaction.

This Example illustrates that NCO loss during grafting is small (i.e. about 15.5% of the original charge).

EXAMPLE 10

The procedure of Example 9 was followed with the exception that the T-291 polybutadiene latex was replaced with GEON® 460X46 polyvinyl chloride - acrylic latex (541.3 g, 48.5% solids) and 115 g of deionized water was used. The peak temperature was again 280° C.

NCO titration of the reaction product showed that about 91% of the NCO charged was still present in the product at the end of the reaction.

This Example again illustrates that NCO loss during grafting is small (i.e. about 9% of the original charge).

EXAMPLE 11

The experiment in Example 6 was repeated and 50 g of the cografted latex product, which contained 7.4 g of solid product, was subjected to four consecutive 24 hour soxhlet extractions with 300 g of acetone, under reflux. The acetone soluble extracted material was precipitated by addition hexane to give Extracts 1, 2, 3 and 4, in quantities indicated below:

| Extract 1 | 2.1 g |
|---|---|
| Extract 2 | 1.9 g |
| Extract 3 | 6.7 g |
| Extract 4 | 6.5 g |
| Residue | not weighed |

Of the above extracts only Extract 1 was isocyanate-functional as demonstrated by the presence of NCO absorption bands as well as bands due to —COO— and C—Cl functionalities in the characteristic regions of the infrared spectrum of Extract 1. The remaining Extracts 2, 3, and 4 did not exhibit NCO absorption bands but indicated the presence of —COO— and C—Cl functionalities in the extracted fractions. The residue was not analyzed.

Although the present invention has been described with reference to certain preferred embodiments, it is apparent that modifications and variations thereof may be made by those skilled in the art without departing from the scope of this invention as defined by the appended claims.

We claim:

1. A low temperature process for preparing an isocyanate-functional homografted latex comprising the steps of:
   (A) introducing, into a reaction zone containing an aqueous medium and a graftable latex, a homografting charge comprising:
      (i) isopropenyl-alpha,alpha-dimethylbenzyl isocyanate;
      (ii) a hydroperoxide, and
      (iii) a free radical redox initiator solution in an amount sufficient to decompose the hydroperoxide; and
   (B) maintaining the reaction zone at a temperature and for a time sufficient to graft the isopropenyl-alpha, alpha-dimethylbenzyl isocyanate.

2. The process of claim 1 wherein the isopropenyl-alpha, alpha-dimethylbenzyl isocyanate concentration in the grafting charge is from 40 weight percent to 99.99 weight percent.

3. The process of claim 1 wherein the hydroperoxide concentration in the homografting charge is from about 5 weight percent to about 0.01 weight percent.

4. The process of claim 1 wherein the free radical redox initiator solution concentration in the homografting charge is from about 60 weight percent to about 0.01 weight percent.

5. The process of claim 1 wherein the weight ratio of the isopropenyl-alpha, alpha-dimethylbenzyl isocyanate to the hydroperoxide in the homografting charge is from about 9:1 to about 9999:1.

6. The process of claim 1 wherein the weight ratio of the isopropenyl-alpha, alpha-dimethylbenzyl isocyanate to free radical redox initiator solution is from about 1:1 to about 9999:1.

7. The process of claim 1 wherein the graftable latex is selected from the group consisting of polybutadiene latex, polyvinyl chloride latex, polyethylene-vinylacetate latex, polystyrene latex, polymethyl methacrylate latex, polyester latex, polyvinyl acetate latex, polyvinyl acetate - acrylic latex, and mixtures thereof.

8. The process of claim 1 wherein the weight ratio of the graftable latex to homografting charge is in the range of from about 100:1 to about 1:1.

9. The process of claim 1 wherein the homografting charge ingredients are introduced into the reaction zone without premixing.

10. The process of claim 1 wherein the homografting charge ingredients are introduced sequentially, with the redox initiator solution (iii) introduced last.

11. The process of claim 1 wherein the time of introducing the homografting charge in step (A) is from about 5 minutes to about 5 hours.

12. The process of claim 1 wherein the homografting time in step (B) is from about 5 seconds to about 5 hours.

13. The process of claim 1 wherein the temperature of the reaction zone is from about 0° C. to about 40° C.

14. The process of claim 1 wherein the unreacted isopropenyl-alpha, alpha-dimethylbenzyl isocyanate is separated from the homografted latex by extraction with a solvent.

15. The process of claim 1 wherein the unreacted isopropenyl-alpha, alpha-dimethylbenzyl isocyanate is separated from the homografted latex by vacuum distillation.

16. A low temperature process for preparing an isocyanate-functional cografted latex comprising the steps of:
(A) introducing into a reaction zone containing an aqueous medium and a graftable latex, a cografting charge comprising:
(i) isopropenyl-alpha,alpha-dimethylbenzyl isocyanate;
(ii) an unsaturated comonomer represented by the formula:

wherein
$R^1$ is selected from a group consisting of hydrogen and alkyl; and
$R^2$ is selected from a group consisting of methoxycarbonyl, ethoxycarbonyl, propoxycarbonyl, butoxycarbonyl, hexoxycarbonyl, 2-ethylhexoxycarbonyl, lauroxycarbonyl, alkyl of 1 to 20 carbon atoms, aryl, aminocarbonyl, acetoxy, and cyano groups;
(iii) a hydroperoxide, and
(iv) a free radical redox initiator solution in an amount sufficient to decompose the hydroperoxide; and
(B) maintaining the reaction zone at a temperature and for a time sufficient to cograft the monomers (i) and (ii).

17. The process of claim 16 wherein the isopropenyl-alpha, alpha-dimethylbenzyl isocyanate concentration in the cografting charge is from about 1 weight percent to about 99 weight percent.

18. The process of claim 16 wherein the unsaturated comonomer concentration in the cografting charge is from about 1 weight percent to about 99 weight percent.

19. The process of claim 16 wherein the hydroperoxide concentration in the cografting charge is from about 5 weight percent to about 0:01 weight percent.

20. The process of claim 16 wherein the free radical redox initiator solution concentration in the cografting charge is from 0.01 weight percent to about 60 weight percent.

21. The process of claim 16 wherein the weight ratio of isopropenyl-alpha, alpha-dimethylbenzyl isocyanate to the unsaturated comonomer is from about 99:1 to about 1:99.

22. The process of claim 16 wherein the weight ratio of isopropenyl-alpha, alpha-dimethylbenzyl isocyanate to the unsaturated comonomer is from 1:1 to 10:1.

23. The process of claim 16 wherein the weight ratio of the ingredients (i) plus (ii) to the hydroperoxide (iii) is from about 0.2:1 to about 9900:1.

24. The process of claim 16 wherein the ratio of the ingredients (i) plus (ii) to the free radical redox initiator solution (iv) is from about 1:1 to about 9900:1.

25. The process of claim 16 wherein the cografting charge ingredients are introduced into the reaction zone without premixing.

26. The process of claim 16 wherein the cografting charge ingredients are introduced sequentially, with the redox initiator solution (iv) introduced last.

27. The process of claim 16 wherein the graftable latex is selected from the group consisting of polybutadiene latex, polyvinyl chloride latex, polyethylene-vinylacetate latex copolymer, polystyrene latex, polymethylmethacrylate latex, polyester latex, polyvinyl acetate latex, polyvinyl acetated-acrylic latex, and mixtures thereof.

28. The process of claim 16 wherein the weight ratio of graftable latex to grafting charge is in the range of from about 100:1 to about 1:1.

29. The process of claim 16 wherein the time of introducing the cografting charge in step (A) is about from 5 minutes to about 5 hours.

30. The process of claim 16 wherein the cografting time in step (B) is from about 5 seconds to about 5 hours.

31. The process of claim 16 wherein the temperature of the reaction zone is from about 0° C. to about 40° C.

32. The process of claim 16 wherein the unreacted cografting monomers are separated from the cografted, latex by extraction with a solvent.

33. The process of claim 16 wherein the unreacted cografting monomers are separated from the cografted latex by vacuum distillation of the unreacted monomers.

34. The product of the process of claim 1.

35. The product of the process of claim 16.

* * * * *